United States Patent
Noda et al.

(10) Patent No.: US 10,144,643 B2
(45) Date of Patent: Dec. 4, 2018

(54) OZONE GENERATION DEVICE

(71) Applicant: Kabushiki Kaisha Toshiba, Minato-ku (JP)

(72) Inventors: Kazuhiko Noda, Hino (JP); Takaaki Murata, Kawasaki (JP); Ryoichi Takahashi, Yokosuka (JP); Kie Kubo, Toshima (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 99 days.

(21) Appl. No.: 15/316,917

(22) PCT Filed: Mar. 13, 2015

(86) PCT No.: PCT/JP2015/001415
§ 371 (c)(1),
(2) Date: Dec. 7, 2016

(87) PCT Pub. No.: WO2015/190017
PCT Pub. Date: Dec. 17, 2015

(65) Prior Publication Data
US 2017/0121176 A1 May 4, 2017

(30) Foreign Application Priority Data
Jun. 12, 2014 (JP) .................. 2014-121747

(51) Int. Cl.
*C01B 13/11* (2006.01)
(52) U.S. Cl.
CPC .......... *C01B 13/11* (2013.01); *C01B 2201/14* (2013.01); *C01B 2201/70* (2013.01)

(58) Field of Classification Search
None
See application file for complete search history.

(56) References Cited

U.S. PATENT DOCUMENTS

| 8,663,569 B2 | 3/2014 | Murata et al. |
| 2012/0156106 A1 | 6/2012 | Murata et al. |

FOREIGN PATENT DOCUMENTS

| CN | 102530879 A | 7/2012 |
| JP | 2000-159508 A | 6/2000 |

OTHER PUBLICATIONS

International Search Report dated Apr. 28, 2015 in PCT/JP2015/001415 filed Mar. 13, 2015.

*Primary Examiner* — Koshor Mayekar
(74) *Attorney, Agent, or Firm* — Oblon, McClelland, Maier & Neustadt, L.L.P.

(57) ABSTRACT

A cylindrical tank-shaped container including: plural parallel electrode tubes; discharge tubes arranged inside the electrode tubes, each forming a discharge gap; a pair of end plates that penetrate and hold both of end sections of the plural electrode tubes; a cooling space formed by the pair of end plates and the inner surface of the tank-shaped container divided between end plates; a cooling medium inlet and a cooling medium outlet formed in opposite end sides of the cooling space; a raw material gas inlet that introduces raw material gas to be sent to the discharge gaps; and an outlet for ozone gas generated from the raw material gas by silent discharge in the discharge gaps, providing an electrode tube in which a discharge tube is not arranged, among the plural electrode tubes, that have surrounding coolant medium that reaches at least a prescribed temperature resulting from the silent discharge.

10 Claims, 3 Drawing Sheets

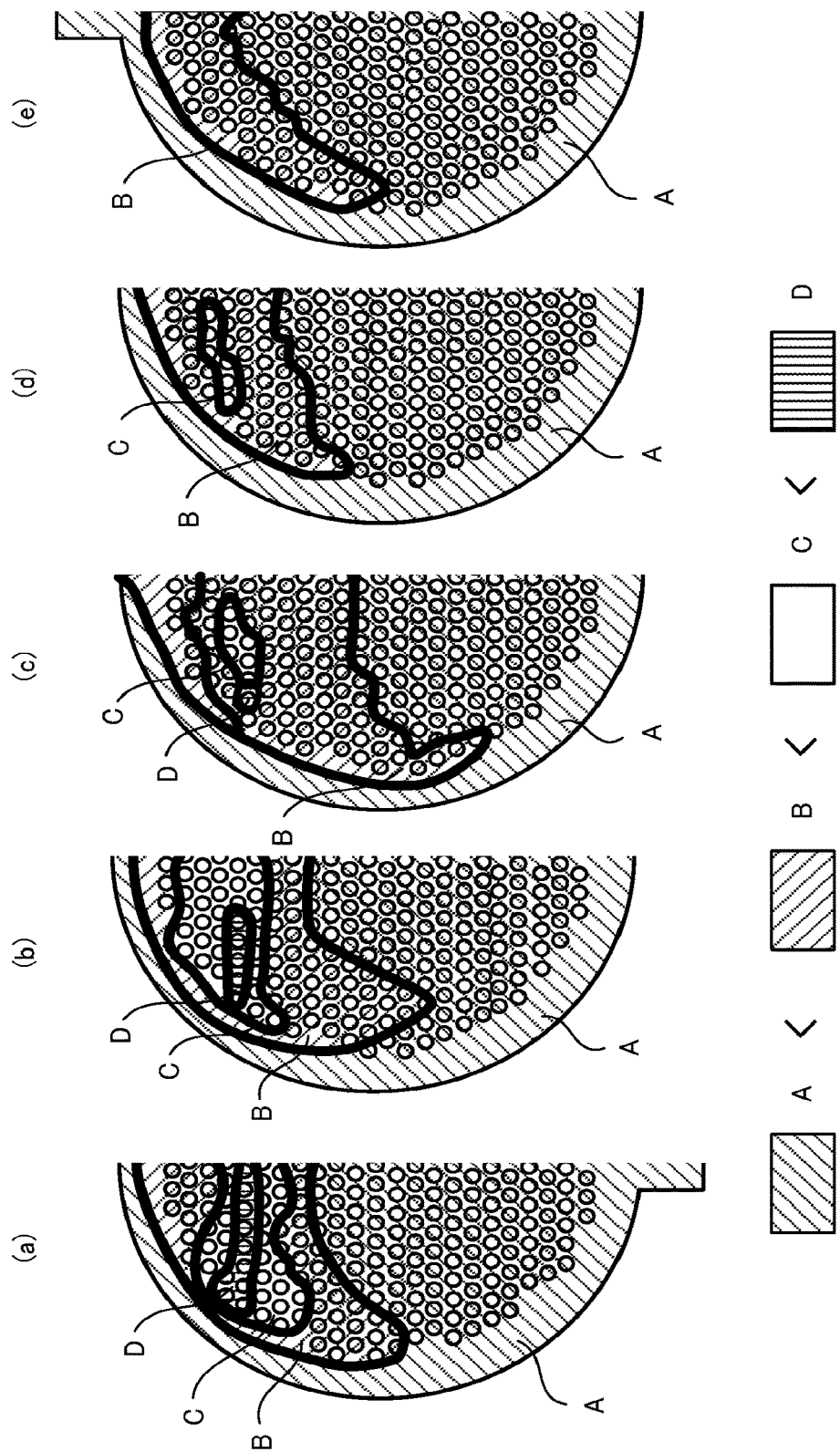

OZONE GENERATION DEVICE

TECHNICAL FIELD

An embodiment according to the present invention relates to an ozone generation device that generates ozone by silent discharge in discharge gaps formed in discharge tubes arranged inside electrode tubes.

BACKGROUND ART

In recent years, an ozone generation device has become to be widely used in advanced water treatment systems. As this ozone generation device, there is an ozone generation device forming discharge gaps by even discharge tubes that are arranged concentrically inside a plurality of electrode tubes that are arranged in parallel inside a tank-shaped container. The ozone generation device having this structure generates ozone gas from a raw material gas by silent discharge in the discharge gaps described above (e.g., see Patent Document 1).

A temperature of the electrode tubes in the ozone generation device having this structure becomes high by the silent discharge. Since the generated ozone decomposes when the temperature of the electrode tubes becomes high, ozone generation efficiency is reduced. Therefore, it is done that a cooling space is formed around the plurality of electrode tubes, a cooling waters flows into this space, and the electrode tube is cooled.

CITATION LIST

Patent Literature

Patent Literature 1: Japanese Patent Application Laid-Open No. 2000-159508

SUMMARY OF INVENTION

Technical Problem

In this case, since the raw material gas flows in the axis direction inside the electrode tubes and the ozone is generated by the silent discharge in the discharge gaps between the discharge tubes arranged inside, a temperature of an ozone gas outlet side of the electrode tube becomes higher than a raw material gas inlet side. Therefore, the ozone gas outlet side section of the electrode tubes need to be cooled effectively. A cooling water inlet to the cooling space is arranged on a lower section close to the ozone gas outlet side of the electrode tubes. A cooling water outlet from the cooling space is arranged on an upper section, arranged on a diagonal section against the cooling water inlet described above, close to the raw material gas inlet side of the electrode tubes.

The cooling water flows from the cooling water inlet to the outlet through the cooling space at a considerable speed in order to secure a prescribed amount of the cooling water inside the limited cooling space. Therefore, sections having high flow speed and low flow speed, resulted from flow stagnation, arise inside the cooling space, and they make the difference of cooling efficiency. Namely, since the cooling water inlet and outlet are arranged on the diagonal section against the cooling space, a flow speed of the cooling water in the diagonal direction is the fastest flow speed among the cooling water flow speeds inside the cooling space. In contrast, since the cooling water strays from the flow in the diagonal direction, close to a corner section of the cooling water inlet inside the cooling space, the flow stagnates and its speed lowers.

Since an upper section of this cooling water inlet is also a section of the ozone gas outlet side in the electrode tubes, the upper section of the cooling water inlet is a section whose temperature becomes high, from the first, by silent discharge. The slower the flow speed of the cooling water becomes and the lower the cooling efficiency becomes, the higher the temperature of the upper section of the cooling water inlet becomes. Therefore, since decomposition of the generated ozone proceeds, the ozone generation efficiency decreases significantly.

An object of the present invention is to provide the ozone generation device to be able to prevent the decreasing of the ozone generation efficiency.

Solution to Problem

An ozone generation device according to the embodiment of the present invention includes a cylindrical tank-shaped container; a plurality of electrode tubes arranged in parallel inside this tank-shaped container, such that the length direction of the electrode tubes follows the axial direction of the tank-shaped container; discharge tubes arranged inside these electrode tubes, each forming a discharge gap; a pair of end plates that penetrate and hold both end section of the plurality of electrode tubes: a cooling space formed by this pair of end plates and the inner surface of the tank-shaped container divided between this pair of end plates; a cooling medium inlet formed in a lower section on one end side of this cooling space; a cooling medium outlet formed in an upper section on the other end side of this cooling space; a raw material gas inlet provided in an end section side in the axial direction of the tank-shaped container, that introduces the raw material gas and causes same to be to sent from the other end side of the discharge tubes to the discharge gaps; and an ozone gas outlet provided on the opposite side in the axial direction of the tank-shaped container, being an outlet for ozone gas generated from the raw material gas by silent discharge in the discharge gaps and providing an electrode tube in which a discharge tube is not arranged, among the plurality of electrode tubes, that have surrounding coolant medium that reaches at least a prescribed temperature as a result of the silent discharge.

According to the above configuration, the decreasing of the ozone generation efficiency will be prevented, as a whole, by not arranging the discharge tubes inside electrode tubes that reaches at least a prescribed temperature as a result of silent discharge.

BRIEF DESCRIPTION OF DRAWINGS

FIG. 5 is a temperature distribution figure widely illustrating (a), (b), (c), (d) and (e) of FIG. 4.

DESCRIPTION OF EMBODIMENTS

The embodiments of the present invention will be described below in detail with reference to the drawings.

Figure 1:
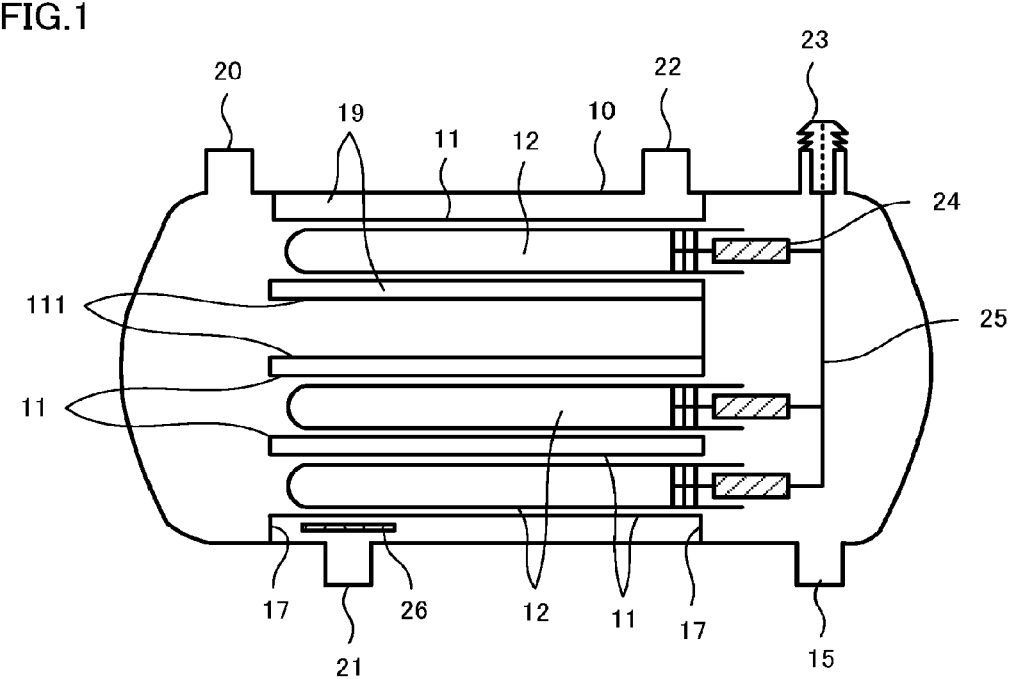
FIG. 1 is a block diagram illustrating an ozone generation device according to the embodiment of the present invention.
Figure 2:
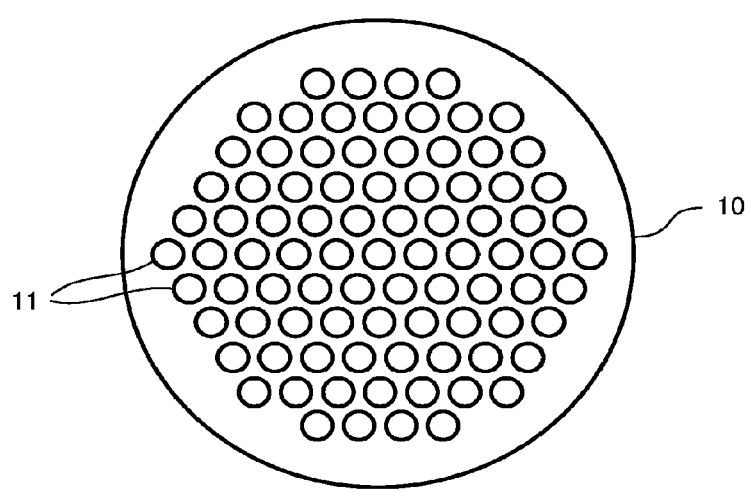
FIG. 2 is an end view illustrating a configuration of an electrode tubes arranged in an ozone generation device according to the embodiment of the present invention.

FIG. 1 shows the overall structure of an ozone generation device according to this embodiment. The ozone generation device is provided with a cylindrical tank-shaped container 10. Electrode tubes 11 is arranged in parallel inside this tank-shaped container 10. The length direction of the electrode tubes 11 follows the axial direction of the tank-shaped container 10. Incidentally, although FIG. 1 shows a relatively small number of electrode tubes 11 in order to prevent the complication of the drawing, a plurality of electrode tubes 11 are arranged actually as shown in FIG. 2.

Both end section of the electrode tubes 11 are held by a pair of end plates 17. Namely, each of the pair of end plates 17 penetrates and holds the end sections of the plurality of electrode tubes 11. Also, a cooling space 19 is formed by the pair of end plates 17 and an inner surface of the tank-shaped container 10 divided between this pair of end plates. A cooling space 19 cools the plurality of electrode tubes 11 by flowing a cooling medium such as water into the cooling space. A cooling medium inlet 21 is formed in a lower section on one end side (the left end in the figure) of the cooling space 19. A cooling medium outlet 22 is formed in an upper section on the other end side (the right end in the figure) of this cooling space 19.

Figure 3:
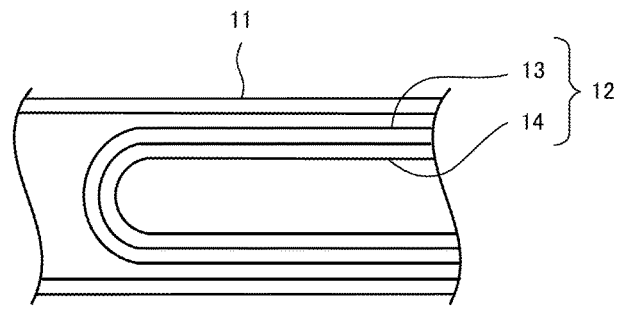
FIG. 3 illustrates a relation between the electrode tubes and discharge tubes.

Each of discharge tube 12 is arranged concentrically inside the plurality of electrode tubes 11, and prescribed discharge gaps are formed between inner surfaces of the electrode tubes 11 and outer surfaces of discharge tubes 12. As shown in FIG. 3, the discharge tubes 12 are comprised of glass tubes 13, an example of electrode coating layer, and stainless films 14 coated on inner surfaces of the glass tubes 13. The discharge gaps are formed between the discharge tubes 12 and the electrode tubes 11.

Quartz glass, borosilicate glass, high silicate glass and silicate glass of aluminum are considered as the material of the glass tubes 13. In addition to glasses, ceramics can be used as dielectric.

The stainless films 14 are electrode coating layer. Gold, silver, copper, chromium, tin, zinc and nickel carbon can be considered as electrode coating layer, in addition to stainless. Also, the electrode film layer may be considered as a thing obtained by such as aluminum sputtering, thermal spraying, vapor, electroless plating and electrolytic plating.

Lengths of the discharge gaps between the discharge tubes 12 and the electrode tubes 11 can be held by, for example, providing projections, not shown in the figures, on the inner surfaces of the electrode tubes 11.

An external power source apparatus, not shown in the figures, and a conductor 25 that penetrates an insulator 23 are connected to the stainless films 14 of each discharge tubes 12 through high-voltage fuses 24. The stainless films 14 are supplied with high-voltage electric power from the power source apparatus, not shown in the figures. Supplied with high-voltage electric power, silent discharge arises in the discharge gaps between the inner surfaces of the electrode tubes 11 and the outer surfaces of the discharge tubes 12, and generates ozone from a raw material as stated below.

A raw material gas inlet 15 is arranged on an end section side in the axial direction of the tank-shaped container (the lower section of the right end in the figure). An ozone gas outlet 20 is arranged on an opposite side in the axial direction of the tank-shaped container 10 (the upper section of the left end in the figure). The raw material gas inlet 15 introduces the raw material gas (the air in this case) into the tank-shaped container 10 and send the gas from other end side of the electrode tubes 11 (the right end in the figure) to the discharge gaps. The ozone gas outlet 20 is used as an outlet for ozone gas generated from the raw material gas by the silent discharge in the discharge gaps inside the electrode tubes 11 and sent from one end of the electrode tubes 11 (the left end in the figure).

In this embodiment, the discharge tubes 12 are not arranged inside electrode tubes (FIG. 1, element 111 is an electron tube without a discharge tube), among the plurality of electrode tubes 11 arranged inside the tank-shaped container 10, that have surrounding coolant medium that reaches at least a prescribed temperature as a result of the silent discharge. At least one end of the electrode tubes 111 not arranging the discharge tubes 12 is closed. In the example of FIG. 1, a right end of the electrode tubes 111 shown in the figure is closed.

Furthermore, a left end of the electrode tubes 111 may be closed and also both ends of the electrode tubes 111 may be closed. The electrode tubes 111 not arranging the discharge tubes 12 are arranged on a relatively upper section among the plurality of electrode tubes 11. For example, the electrode tubes 111 are arranged at 70% to 80% height from the bottom in the height direction of the tank-shaped container 10.

In the above configuration, the raw material gas flows into a right side space of the tank-shaped container 10, shown in FIG. 1, through the raw material gas inlet 15. Thereafter, the raw material gas flows inside the electrode tubes 11 from the right side to the left side in FIG. 1, and flows into the discharge gaps between the inner surfaces of the electrode tubes 11 and the outer surfaces of the discharge tubes 12. On this occasion, the silent discharge arises in the gaps between the stainless films 14 being high-voltage electrodes and the electrode tubes 11 being earth electrodes. At this time, a part of the raw material gas change into the ozone, and the ozone gas is generated. The generated ozone gas flows from the left end, shown in the figure, of the electrode tubes 11 into the right side space, shown in the figure, of the tank-shaped container 10 and is drained from the ozone gas outlet 20.

Heat is generated due to the silent discharge in the electrode tubes 11, and the electrode tubes 11 become high temperature by heating with the lapse of time. Therefore, the heated electrode tubes 11 are cooled by flowing cooling medium, for example cooling water, into the cooling space 19 formed outside.

In the electrode tubes 11, a temperature of the ozone gas outlet 20 side becomes relatively higher than the raw material gas inlet 15 side. In the electrode tubes 11, a left side section in the ozone gas outlet 20 side shown in the figure is needed to be cooled effectively. The cooling medium is injected from the cooling medium inlet 21 arranged on a lower section of a left side, shown in the figure, of the cooling space 19 close to the ozone gas outlet 20.

The cooling medium flows from the cooling medium inlet 21 to the cooling medium outlet 22, in the opposite side of the inlet 21, through the cooling space 19 at a considerable speed in order to secure a prescribed amount of the cooling water inside the limited cooling space 19. Therefore, sections having high flow speeds and low flow speeds resulted from flow stagnation arise inside the cooling space 19.

The cooling medium inlet 21 and the outlet 22 are arranged, as shown in FIG. 1, on a diagonal section against the cooling space 19. A flow in the diagonal direction from lower left to upper right shown in the figure has the fastest flow speed among the cooling water flow directions inside the cooling space 19. In contrast, since the cooling water close to corner sections, shown in the upper left section and in the lower right section of the figure, inside the cooling space strays from the flow in the diagonal direction described above, the flow stagnates and its speed become lower. Therefore, a temperature distribution inside the cooling space 19 is as shown in FIG. 4 and FIG. 5.

Figure 4:
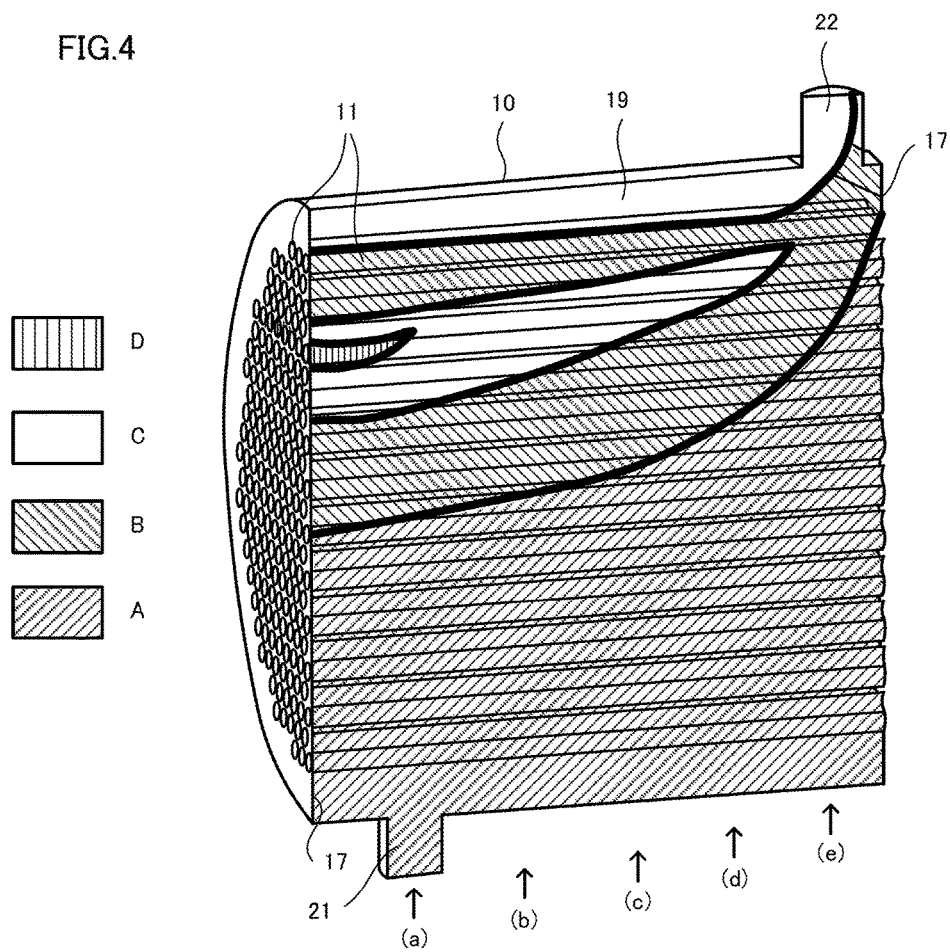
FIG. 4 illustrates a temperature distribution of a cooling space of a typical ozone generator.

FIG. 4 illustrates the inside of the cooling space formed between a pair of end plate 17 inside the tank-shaped container 10 shown in FIG. 1 and a temperature distribution following the axial direction of the cooling space 19. (a), (b), (c), (d) and (e) in FIG. 5 illustrate a temperature distribution of a cross section of the cooling space 19 shown in FIGS. 4 (a), (b), (c), (d) and (e).

In FIG. 4 and FIG. 5, temperature is divided into four temperature areas A, B, C and D. The temperatures in the temperature areas A, B, C and D have a relation of A<B<C<D.

Namely, a lower half section of the left side section in FIG. 4 that is a directly above section of the cooling medium inlet 21 is a part of the lowest temperature area A. Also, since the diagonal section heading for the cooling medium outlet 22 from the cooling medium inlet 21 inside the cooling space 19 has the low flow speed as described above, the low temperature area A and the medium temperature area B are mixed. Seeing a corner section out of the above diagonal section inside the cooling section 19, in the lower right section in FIG. 4, a flow of the cooling medium (cooling water) stagnates and its speed become lower. However, since the right side shown in the figure is the raw material gas inlet side against the electrode tubes 11, a temperature of the right side does not become high and the right side is the low temperature area A.

In contrast, a upper left section of FIG. 4 is occupied by the high temperature sections C and D since the cooling medium flow (cooling water) at the upper left section stagnates, its speed becomes lower and the upper left section is the ozone gas outlet section of the electrode tubes 11. These high temperature areas C and D spread across the width direction of a cross section shown in FIGS. 5 (a), (b) and (c).

In this embodiment, the hollow electrode tubes 111, shown in FIG. 1, is comprised as not arranging the discharge tubes 12 inside the electrode tubes 11 located in the high temperature area D at least among these high temperature areas C and D. Here, ozone decomposition proceeds significantly, described above, regarding the electrode tubes 111 in the highest temperature area D. Therefore, though the discharge tubes 12 are arranged here and generate ozone, the most part of it is decomposed. Also, since the influence of temperature against the surrounding electrode tubes 11 is great and it expedites the ozone decomposition, the ozone generation efficiency decreases as a whole.

Therefore, the discharge tubes 12 are not to be arranged inside the electrode tubes 111 in the highest temperature area D. Since the silent discharge does not arise in sections without the discharge tubes 12, the electrode tubes 11 is not heated. Accordingly, it is possible to prevent the decreasing of ozone generation efficiency as a whole and it is able to obtain enough ozone gas more than decreasing of the amount of the generated ozone due not to generate the ozone gas in the electrode tubes 111.

The present invention is not limited to the above embodiments. For example, a buffer plate 26 may be arranged, as shown in FIG. 1, between the cooling medium inlet 21 and the electrode tubes 11. The buffer plate 26 is arranged at a distance from the inner wall of the tank-shaped container 10 by a fixture not shown in the figures. After the cooling water from the cooling medium inlet 21 into the tank-shaped container 10 clashes with the buffer plate 26, the cooling water flows out in the axial direction and the circumferential direction inside the tank-shaped container 10 through a gap between the buffer plate 26 and the tank-shaped container 10. The cooling water is able to be dispersed across the entire width of the tank-shaped container 10, and cooling efficiency inside the tank-shaped container 10 is improved.

Also, a porous plate instead of the buffer plate 26 may be arranged on the inner wall of the tank-shaped container in the state of being arranged at the cooling medium inlet 21. The porous plate is comprised by forming a plurality of pores in plate material. The cooling water flowing from the cooling medium inlet 21 into the tank-shaped container 10 leaks uniformly in the longitudinal direction of the electrode tubes 11 through the pores of the porous plate. Thereby, the cooling water is able to be dispersed uniformly across the entire width of the tank-shaped container 10 in the electrode tubes 11, and the cooling efficiency is improved. Since a temperature of air flowing inside the electrode tubes 11 is lower than a conventional one, it is possible to realize an ozone generation device having a high capture rate. The porous plate is able to lower a flow speed of a high speed cooling water that flows from the cooling medium inlet 21 and clashes with the electrode tubes 11, restrain vibrations of the electrode tubes 11, and realize a high reliability ozone generation device.

The porous plate has been described to be arranged on the cooling medium inlet 21 and, in addition thereto, may be also arranged on the cooling medium outlet 22. The porous plate of the cooling medium outlet 22 is able to make the electrode tubes 11 be orthogonal to the cooling medium flowing through the electrode tubes 11. In general, a flow being orthogonal to the electrode tubes 11 is able to give a higher heat transfer performance than a flow inclining against the electrode tubes 11. Accordingly, a temperature of the air flowing through the electrode tubes 11 is lower than a conventional one, and furthermore, realizes a high capture rate ozone generation device.

While certain embodiments have been described, these embodiments have been presented by way of example only, and are not intended to limit the scope of invention. Indeed, the novel apparatus, methods and system described herein may be embodied in a variety of other forms; furthermore, various omissions, substitutions and changes in the form of the apparatus, methods and system described herein may be made without departing from the spirit of the inventions. The accompanying claims and their equivalents are intended to cover such forms or modifications as would fall within the scope and spirit of the inventions.

REFERENCE SIGNS LIST

10: Tank-shaped container
11: Electrode tube
12: Discharge tube
15: Raw material gas inlet
17: End plate
19: Cooling space
20: Ozone gas outlet
21: Cooling medium inlet
22: Cooling medium outlet
26: Buffer plate
111: Electrode tube of not arranging discharge tube

The invention claimed is:

1. An ozone generation device, comprising:
a cylindrical tank-shaped container;
a plurality of electrode tubes including dielectric discharge tubes, arranged in parallel inside the cylindrical tank-shaped container, such that the length direction of the electrode tubes follows the axial direction of the cylindrical tank-shaped container, the dielectric discharge tubes being arranged inside of the plurality of electrode tubes, each forming a discharge gap;

a pair of end plates that penetrate and hold both end sections of the plurality of electrode tubes including dielectric discharge tubes;

a cooling space formed by this pair of end plates and the inner surface of the cylindrical tank-shaped container divided between this pair of end plates;

a cooling medium inlet formed in a lower section on one end side of this cooling space;

a cooling medium outlet formed in an upper section on the other end side of this cooling space;

a raw material gas inlet provided in an end section side in the axial direction of the cylindrical tank-shaped container, the raw material gas inlet introducing a raw material gas, and the raw material gas flowing to another end side of the dielectric discharge tubes to the discharge gaps; and an ozone gas outlet provided on the opposite side of the raw material gas inlet in the axial direction of the cylindrical tank-shaped container, being an outlet for ozone gas generated from the raw material gas by silent discharge in the discharge gaps; and the plurality of electrode tubes including at least an electrode tube, excluding the dielectric discharge tubes, in which a dielectric discharge tube is not arranged, at least the electrode tube in which the dielectric discharge tube is not arranged is provided at a position that a temperature reaches a prescribed temperature as a result of the silent discharge in a surrounding cooling medium area.

2. The ozone generation device according to claim 1, wherein
at least one end of the electrode tube in which the dielectric discharge tube is not arranged is closed.

3. The ozone generation device according to claim 2, wherein
the electrode tube in which the dielectric discharge tube is not arranged is arranged at 70% to 80% height from the bottom in the height direction of the cylindrical tank-shaped container.

4. The ozone generation device according to claim 1, wherein
the electrode tube in which the dielectric discharge tube is not arranged is arranged at 70% to 80% height from the bottom in the height direction of the cylindrical tank-shaped container.

5. The ozone generation device according to claim 1, wherein
projections are formed on inner surfaces of the electrode tubes including the dielectric discharge tubes, and in lengths of discharge gaps formed between the dielectric discharge tubes and electrode tubes in which the dielectric discharge tube is not arranged.

6. The ozone generation device according to claim 1, wherein
a buffer plate is arranged between the cooling medium inlet and the electrode tubes in which the dielectric discharge tube is not arranged.

7. The ozone generation device according to claim 1, wherein
a porous plate is arranged on the cooling medium inlet, the porous plate penetrating a cooling medium which extends to a space between the pair of end plates.

8. The ozone generation device according to claim 7, wherein
the porous plate is a plate including a plurality of pores.

9. The ozone generation device according to claim 7, wherein
the porous plate makes a cooling medium flow in an orthogonal direction to the electrode tubes.

10. The ozone generation device according to claim 1, wherein
a first porous plate is arranged on the cooling medium inlet and a second porous plate is arranged on the cooling medium outlet, each of the first porous plate and the second porous plate penetrating a cooling medium which extends to a space between a pair of end plates.

* * * * *